United States Patent [19]

Kurei

[11] Patent Number: 5,341,187
[45] Date of Patent: Aug. 23, 1994

[54] AUTOMATIC CAMERA WITH FILM REWIND APPARATUS AND METHOD CAPABLE OF REWINDING FILM IN EITHER A FIRST OR SECOND OPERATION MODE

[75] Inventor: Hiroshi Kurei, Sakado, Japan

[73] Assignee: Asahi Kogaku Kogyo Kabushiki Kaisha, Tokyo, Japan

[21] Appl. No.: 835,337

[22] Filed: Feb. 14, 1992

[30] Foreign Application Priority Data

Feb. 18, 1991 [JP] Japan .................................. 3-108074

[51] Int. Cl.$^5$ ............................................... G03B 1/18
[52] U.S. Cl. .................................. 354/173.11; 354/214
[58] Field of Search ................. 354/173.1, 173.11, 214

[56] References Cited

U.S. PATENT DOCUMENTS

| | | | |
|---|---|---|---|
| 4,855,772 | 8/1989 | Hashimoto et al. | 354/173.1 |
| 4,952,954 | 8/1990 | Kitazawa | 354/173.1 |
| 4,967,217 | 10/1990 | Yamamoto et al. | 354/173.11 |
| 5,032,858 | 7/1991 | Kobayashi et al. | 354/214 X |

Primary Examiner—Michael L. Gellner
Assistant Examiner—J. K. Han
Attorney, Agent, or Firm—Sandler, Greenblum & Bernstein

[57] ABSTRACT

A film rewind apparatus is employed in an automatic camera that is capable of automatically rewinding a film that has been pulled out of a cartridge. The film is automatically rewound in either a first or a second operation mode. The rewinding operation is completed with a leading end of the film retracted into the cartridge when the film is rewound in the first operation mode, while the rewinding operation is completed with the leading end of the film remaining outside of the cartridge when the film is rewound in the second mode.

31 Claims, 9 Drawing Sheets

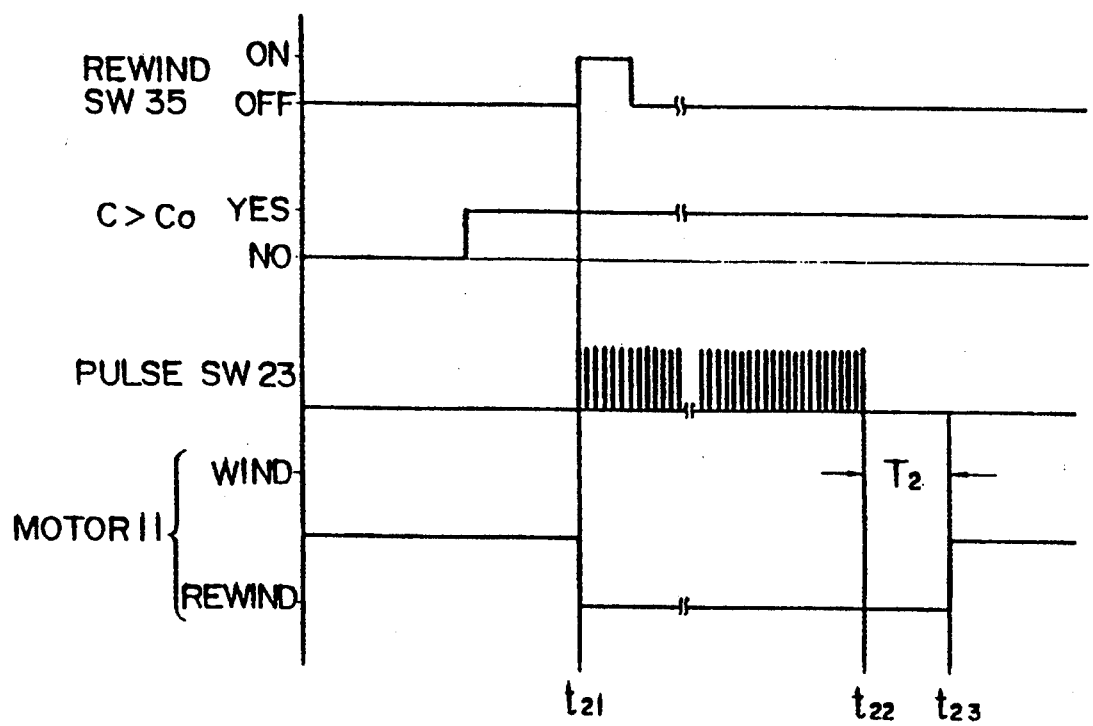
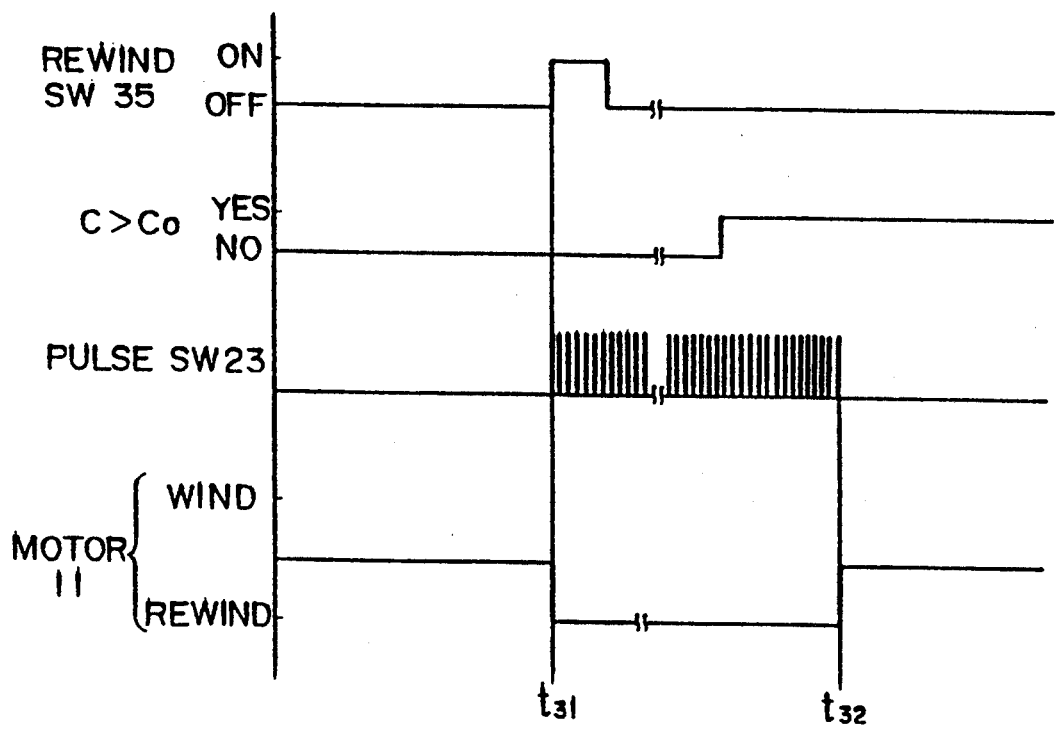

AUTOMATIC CAMERA WITH FILM REWIND APPARATUS AND METHOD CAPABLE OF REWINDING FILM IN EITHER A FIRST OR SECOND OPERATION MODE

Background of the Invention

The present invention relates to a film rewind apparatus and method for an automatic camera which rewinds a film into a film cartridge that is loaded in a camera.

Recently, various automatic features for the operation of a camera have been promoted, including where a rewind operation of a film is carried out through a motor drive. This film rewind operation is chiefly characterized by two methods: one is an automatic rewind operation effected in response to a detection of a condition that a film has fully wound up to the end; and the other is an forcible rewind operation effected in response to a switching operation of a rewind switch by an operator before a film is fully wound up to the end.

Further, in view of the specific rewinding operation, there are mainly two separate methods. That is, one rewinding method is to rewind a film completely into a film cartridge, and the other rewinding method is to rewind a film but to stop it in an incomplete condition such that only a tip end of the film remains out of the film cartridge so that the film can be again pulled out from the film cartridge to wind in an occasion for another photographing.

A conventional camera has adopted either one of these two rewinding methods for both the operation of automatic rewind operation effected in response to the detection of the condition that the film has fully wound up to the end, and the forcible rewind operation effected in response to the switching operation of the rewind switch by the operator before the film is fully wound up to the end. In other words, the conventional camera has been operated in the same way between the automatic rewind operation and the forcible rewind operation.

However, if a film is completely rewound into the film cartridge all the time, even in the forcible rewind operation, it was difficult to take out a tip end of the film again from the film cartridge without any unexpected exposure in the occasion that the operator wants to take a photograph by using the reminders of the film which are not used yet.

To the contrary, if a film is incompletely rewound into the film cartridge, it was feared that the operator might mistakenly use the film again, resulting in unexpectedly duplicated or repeated exposures.

SUMMARY OF THE INVENTION

It is therefore an object of the present invention to avoid the aforementioned problems and disadvantages encountered in the prior art, by providing an improved film rewind apparatus and method for an automatic camera which is capable of facilitating an additional usage of film for another photographing occasion in the case that the film has been forcibly rewound before being fully exposed, and also prohibiting a mistaken usage of the film in the case that the film has been completely used without any unexposed film part.

For the above object, according to an aspect of the present invention, there is provided a film rewind apparatus employed in an automatic camera for automatically rewinding a film having been pulled out of a cartridge, wherein the film includes a plurality of image frames, comprising:

means for selecting one of a first and second operation mode;

means for automatically rewinding the film, the rewinding means being operated in either the first or second operation mode; and means for controlling the rewinding said film in such a fashion that the rewinding operation is completed with a leading end of the film being retracted in the cartridge when the first operation mode is selected, while the rewinding operation is completed with the leading end of the film remaining out of the cartridge when the second operation mode is selected.

Optionally, the camera comprises means for winding the film, wherein the selecting means comprises means for detecting the end of the film, the film being rewound in the first operation mode when the end of the film has been detected.

Further, the selecting means comprises means for instructing the start of rewinding, the film being rewound in the second operation mode upon an instruction from the instructing means.

Alternatively, the camera comprises means for instructing the start of rewinding, wherein the selecting means comprises a mode determining means for selecting one of the first and second operation modes in accordance with the frames remaining unused.

According to a further aspect of the invention, there is provided a method for rewinding a film, which includes a plurality of image frames, into a cartridge located in an automatic camera, the camera comprising means for automatically rewinding a film, the method comprising the steps of:

selecting one of a first and second rewind mode:

starting a rewinding operation: and completing the rewinding operation in such a fashion that a leading end of the film is retracted into the cartridge when the first rewind mode is selected, while the leading end of the film remains outside of the cartridge when the second rewind mode is selected.

According to still another aspect of the invention, there is provided an automatic camera that is capable of automatically rewinding a film which has been pulled out of a cartridge, the film including a plurality of image frames, the camera comprising:

means for selecting one of a first and second rewind mode;

means for automatically rewinding said film, the rewinding means being operated in either a first or a second operation mode; and means for controlling the rewinding the film in such a fashion that the rewinding operation is completed with the leading end of the film being retracted in the cartridge when the first rewind mode is selected, while the rewinding operation is completed with the leading end of the film remaining outside of the cartridge when the second rewind mode is selected.

According to a further aspect of the invention, there is provided a film rewind apparatus employed in an automatic camera that is capable of automatically rewinding a film which has been fed from a cartridge, comprising:

means for rewinding the film, at least in a first mode, in which a rewinding operation is completed with a leading end of the film being retracted into the cartridge, and in a second mode in which the rewinding operation is completed with the leading end of the film remaining outside of the cartridge; and means for selecting one of the first and second modes.

The above and other objects, features and advantages of the present invention will become apparent from the following detailed description which is to be read in conjunction with the accompanying drawings.

DESCRIPTION OF THE ACCOMPANYING DRAWINGS

FIG. 9 is a time chart showing a forcible rewinding operation in the second embodiment; and FIG. 10 is a time chart showing another forcible rewinding operation in the second embodiment.

Description of the Embodiments

Hereinafter, referring now to accompanying drawings, the preferred embodiments of the present invention are described in detail.

Structure of the film rewind apparatus

Figure 1:
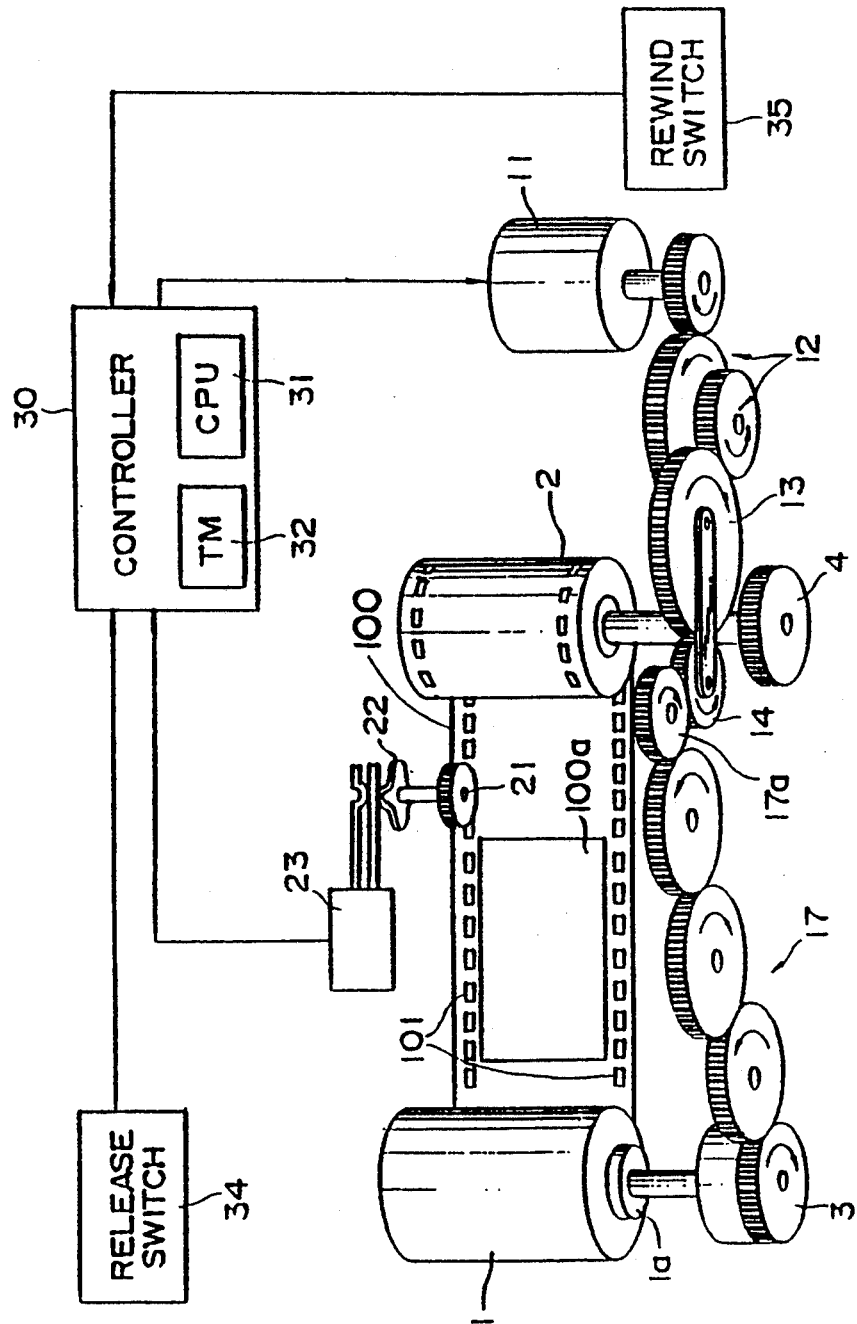
FIG. 1 is a view showing a film rewind apparatus in accordance with the present invention.

FIG. 1 is a view showing a film rewind apparatus in accordance with present invention. In FIG. 1, some essential portions, such as a lens and a photographing mechanism, are omitted in order to clearly show the structure related to the invention and to explain it concisely.

In the drawing, reference numeral 1 denotes a film cartridge which winds a film 100 up and accommodates it therein. The film cartridge 1 is loaded in a predetermined portion on a camera, as is well known in the art. Reference numeral 2 is a spool for winding up the film 100 by pulling the film 100 out of the film cartridge 1. A photographing picture plane 100a of the film 100 is disposed to be interposed between the film cartridge 1 and the spool 2. Reference numeral 3 denotes a rewinding fork gear, and reference numeral 4 denotes a spool gear which is directly connected to the spool 2.

Reference numeral 11 denotes a DC motor which serves as a driving source for winding the film 100 up and for rewinding it into the film cartridge 1. The DC motor 11 is able to rotate in both a normal rotational direction and a reverse rotational direction. The rotation of the motor 11 is reduced by a reduction gear 12 and transmitted to a sun gear 13.

The sun gear 13 is meshed with a planetary gear 14. An arm 15 is provided to connect between a central axis of the sun gear 13 and a central axis of the planetary gear 14. The arm 15 is supported to be swingable about the central axis of the sun gear 13. Accordingly, the planetary gear 14 is not only driven to rotate about its rotational axis in accordance with the rotation of the sun gear 13, but also is driven to circulate about the central axis of the sun gear 13 with being guided by the arm 15. In other words, the planetary gear 14 circulates about the central axis of the sun gear 13 in accordance with the rotation of the sun gear 13 when the planetary gear 14 does not receive any external force.

Reference numeral 17 denotes a group of rewinding gears which mesh with the rewinding fork gear 3 at the end thereof. A small gear 17a (hereinafter, referred as a rewinding gear 17a) located at the other end of the group of rewinding gears 17 is disposed to mesh with the planetary gear 14. Both the rewinding gear 17a and the spool gear 4 are disposed around and spaced from the sun gear 13 so as not to mesh with the sun gear 13.

As a result of such a layout of the rewinding gear 17a, the sun gear 13, the planetary gear 14, and the spool gear 4, the motor 11 can perform both a winding operation and a rewinding operation. That is, when the motor 11 causes a normal rotation, the planetary gear 14 moves around the sun gear 13 guided by the arm 15 until it reach a position to mesh with the spool gear 4.

Accordingly, upon the planetary gear 14 meshing with the spool gear 4, the spool 2 initiates a rotation in a direction the film 100 is wound up. To the contrary, when the motor 11 causes a reverse rotation, the planetary gear 14 moves towards an opposite direction around the sun gear 13 back to a position to mesh with the rewind gear 17a, as shown in FIG. 1. Therefore, upon the planetary gear 14 meshing with the rewinding gear 17a a cartridge shaft 1a initiates a rotation in a direction the film 100 is rewound into the cartridge 1.

Reference numeral 21 denotes a sprocket which engages with perforations 101 formed on the upper and the lower edges of the film 100. The sprocket 21 has a central axis which is fixedly connected with a cross-shaped rotation element 22. The rotation element 22 contacts with a micro-switch type switch 23 at a tip portion thereof so as to change the switch from an ON-condition to an off-condition, or vice versa.

Accordingly, if the rotation element 22 causes one complete rotation, the switch 23 repeats ON-and-OFF conditions a total of four times. Thus, four pulses are generated from the switch 23. Hereinafter the switch 23 is referred as a "pulse switch 23."

In this embodiment, the sprocket 21 causes two complete rotations to wind up one frame of the film 100. Therefore, the pulse switch 23 generates eight pulses for one winding up corresponding one frame of the film 100.

Reference numeral 30 denotes a controller which performs controls of various operations of the camera. The controller 30 includes a central processing unit (CPU) 31 and a timer (TM) 32.

Reference numeral 34 denotes a release switch (i.e. a shutter button) which is disposed on an upper surface of the camera, and a reference numeral 35 denotes a rewind switch which is disposed on a bottom of the camera. The release switch 34, the rewind switch 25, and the pulse switch 23 are connected to an input terminal of the controller 30. On the other hand, an output terminal of the controller 30 is connected to a driving circuit of the motor 11.

Driving Circuit of Winding and/or Rewinding Motor

Figure 2:
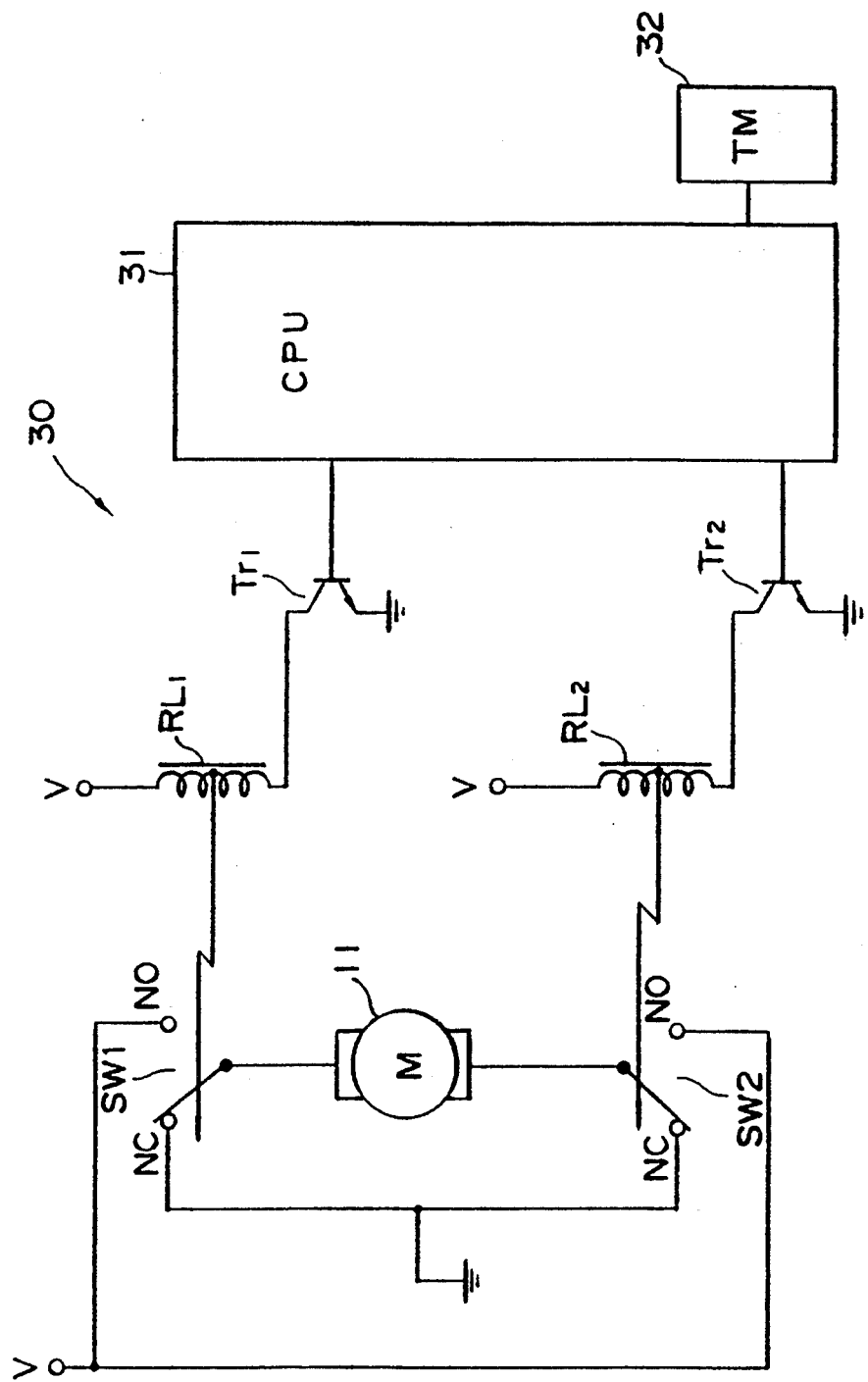
FIG. 2 is a circuit diagram showing a driving circuit of a motor for a winding and rewinding operation.

FIG. 2 is a circuit diagram showing a driving circuit of the motor 11. In the drawing, the motor 11 is connected with switches SW1 and SW2 at both electric terminal ends. Each of the switches SW1 and SW2 has a normally-closed contact NC and a normally-opened contact NO. When the motor 11 is not activated, both electric terminal ends of the motor 11 are connected to the normally-closed contacts NC, NC of the switches SW1 and SW2, which are grounded. Therefore, the motor 11 is electrodynamically braked when it is not operated. The normally-opened contacts NO, NO' of the switches SW1 and SW2 are connected to a voltage V, which serves as an electric power source.

Switch SW1 is switched over by a relay coil RL1, which is interposed between the voltage V and ground. A drive transistor Tr1 is connected in series with the relay coil RL1 so as to activate or deactivate the energization of the relay coil RL1. A base terminal of the drive transistor Tr1 is connected to the output terminal of the CPU 31.

When a high signal is inputted to the base of the drive transistor Tr1, the relay coil RL1 is energized. As a result, the switch SW1 is changed over from the normally-closed contact NC to the normally-opened contact NO. Thus, the electric power source is supplied to the motor 11 through the switch SW1. The electric conductive path in this case is expressed in the order of the voltage V, the normally-opened contact NO of the switch SW1, the motor 11, the normally-closed contact NC of the switch SW2, and ground. As a result of this switching operation, the motor 11 causes and continues a normal rotation to wind up the film 100, as long as this condition is maintained.

When a low signal is inputted to the base of the drive transistor Tr1, the relay coil RL1 is deenergized. Therefore, the switch SW1 is switched over again to the normally-closed contact NC, resulting in the motor 11 being deactivated and electrodynamically braked.

In the same way, the switch SW1 is switched over by a relay coil RL2, which is interposed between the voltage V and ground. A drive transistor Tr2 is connected in series with the relay coil RL2, so as to activate or deactivate the energization of the relay coil RL2. A base terminal of the drive transistor Tr2 is connected to the output terminal of the CPU 31.

When a high signal is inputted to the base of the drive transistor Tr2, the relay coil RL2 is energized As a result, the switch SW2 is changed over from the normally-closed contact NC to the normally-opened contact NO. Thus, the electric power source is supplied to the motor 11 through the switch SW2. The electric conductive path in this case is expressed in the order of the voltage V, the normally-opened contact NO of the switch SW2, the motor 11, the normally-closed contact NC of the switch SW1, and ground. As a result of this switching operation, the motor 11 causes and continues a reverse rotation to rewind the film 100, as long as this condition is maintained.

When a low signal is inputted to the base of the drive transistor Tr2, the relay coil RL2 is deenergized Therefore, the switch SW2 is switched over again to the normally-closed contact, resulting in the motor 11 being deactivated and electrodynamically braked.

The drive transistors Tr1 and Tr2 serve as an amplifier, which amplifies a weak electric signal outputted from the CPU into a large electric current which is sufficient to actuate the relay coil RL1 or RL2.

Figure 3:
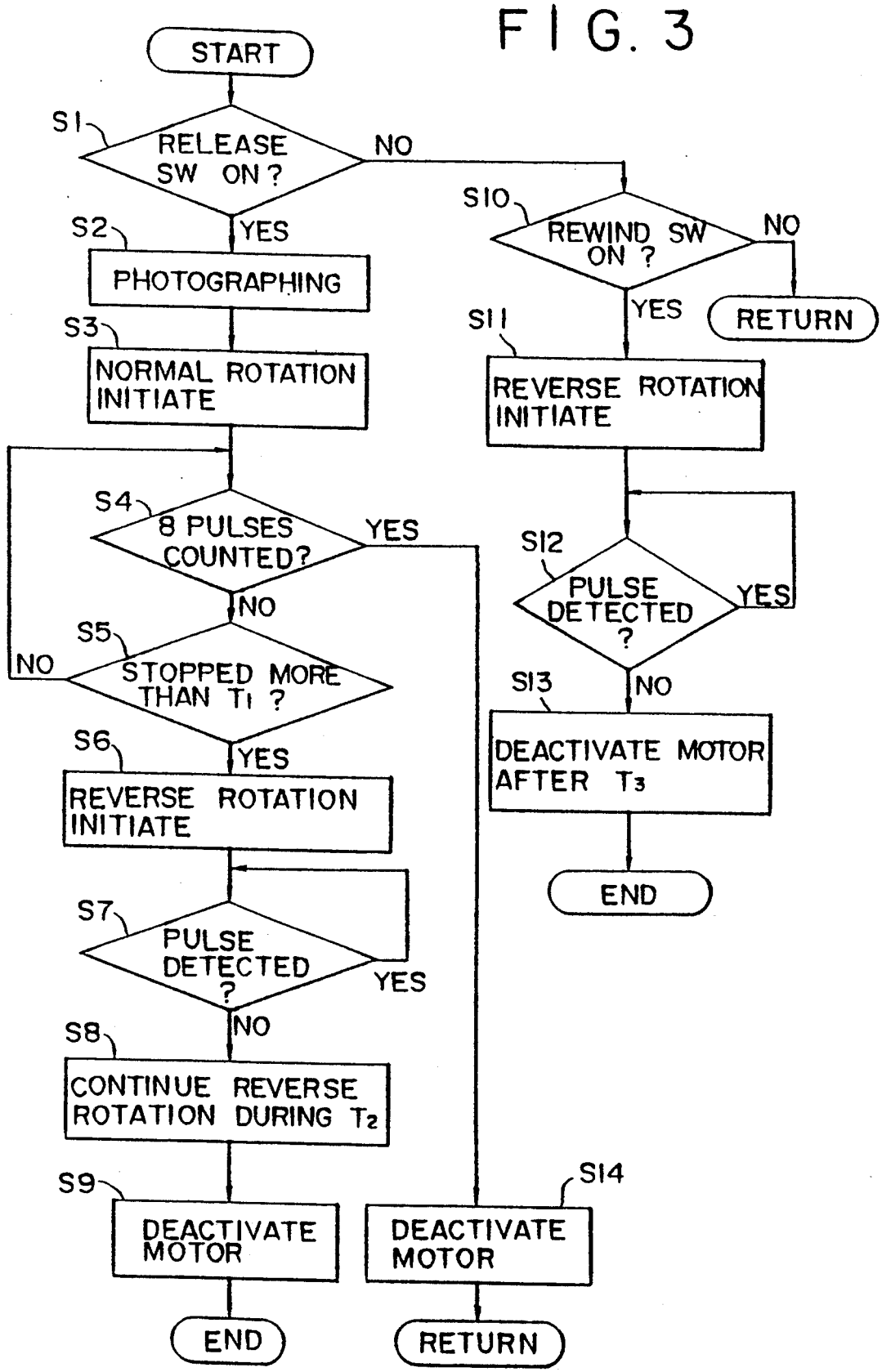
FIG. 3 is a flow chart showing detail processing carried out in a control portion of a first embodiment in accordance with the present invention.
Figure 4:
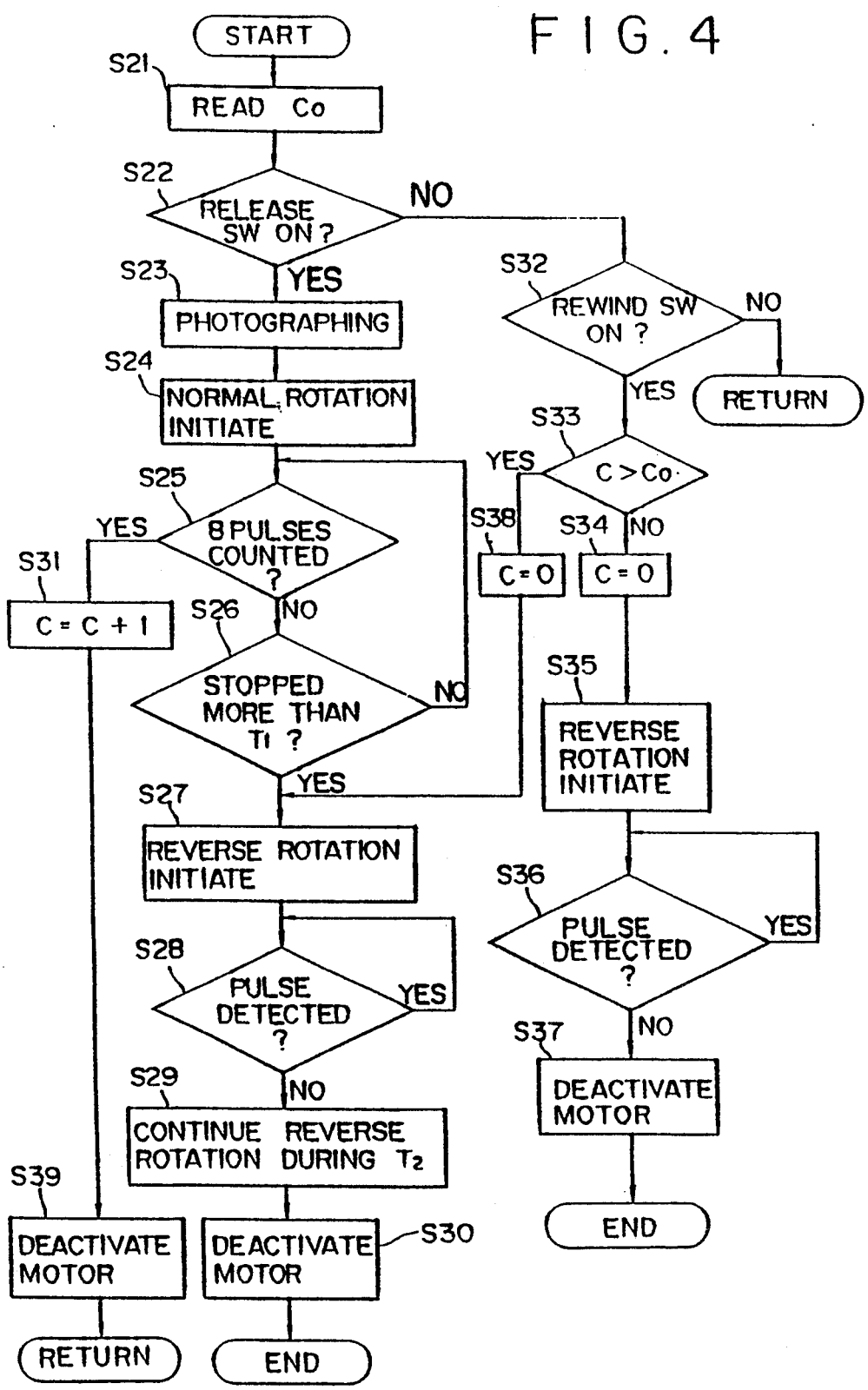
FIG. 4 is a flow chart showing a detail processing carried out in a control portion of a second embodiment in accordance with the present invention.

Next, referring now to FIGS. 3 and 4, an operation of the controller 30 is explained in more detail.

First Embodiment of the Film Rewinding Control

According to the flow chart of FIG. 3, first of all it is judged as to whether the release switch 34 is manipulated to an ON-position or not in step S1. If the judgement is YES, the controller 30 carries out a predetermined photographing operation which comprises an auto focus adjustment and an auto exposure adjustment in step S2. After the predetermined photographing operation has been completed, the controller 30 controls the motor 11 to initiate a normal rotation in step S3.

That is, in FIG. 2, the CPU 31 outputs a high signal to the base of the transistor Tr1. In response to this, the relay RL1 is energized. Accordingly, switch SW1 is switched over from the normally-closed contact to the normally-opened contact. Thus, the motor 11 is activated to cause a normal rotation.

Upon the motor 11 causing the normal rotation, the planetary gear 14 moves around the sun gear 13 guided by the arm 15 until it reaches the position to mesh with the spool gear 4, as is explained in the foregoing description of FIG. 1. Then, the film 100 begins to be wound up in the spool 2. In this instance, the sprocket 23 rotates in accordance with the perforations 101 passing in the winding operation. Therefore, the pulse switch 23 generates pulse signals on the basis of an amount of winding operation. The controller 30 inputs the count number counted in the pulse switch 23, and determines whether eight consecutive pulses are counted in step S4.

If the judgement in step S4 is YES, it means that one frame of the film 100 has been completely wound. Therefore, the controller 30 proceeds to step S14 to deactivate the motor 11 and the process is returned to the beginning of the flowchart. In detail, in FIG. 2, CPU 31 outputs a low signal to the drive transistor Tr1. In response to this, the relay RL1 is deenergized and, in turn, switch SW1 is switched over to the normally-closed position. Thus, the motor 11 is stopped and electrodynamically braked.

If the judgement in step S4 is NO, it is further determined in step S5 whether the pulse generation has been stopped for more than time T1. Time T1 is freely selected, but it usually is desirable to be set between 1 to 3 seconds.

Namely, time T1 is a period of time which is required to determine whether the film 100 has been completely wound up to the end in the spool 2. If the film 100 is fully pulled out of the film cartridge 1 under the condition that the base end of the film 100 is fixed to the cartridge shaft 1a of the film cartridge 1, film 100 is tightly extended between the film cartridge 1 and the spool 2. In this condition, the motor 11 is rendered in a stall. Accordingly, if the pulse generation has been stopped for more than time T1, it is recognized that the film 100 has been completely wound.

If the judgement in step S5 is N0, the controller 30 performs the previous step S4 to continue the determination in step S4.

If the determination in step S5 is YES, the controller 30 performs step S6, wherein the controller 30 controls the motor 11 to cause a reverse rotation.

That is, in FIG. 2, the CPU 31 outputs a high signal to the base of the transistor Tr2. In response to this, the relay RL2 is energized. Accordingly, switch SW2 is switched over from the normally-closed contact NC to the normally-opened contact NO. Thus, the motor 11 is activated to cause a reverse rotation.

Upon the motor 11 causing the reverse rotation, the planetary gear 14 moves around the sun gear 13 guided by the arm 15 until it returns the position to mesh with the rewinding gear 17a, as is explained in the foregoing description of FIG. 1. Then, the film 100 begins to be rewound in the film cartridge 1. The controller 30 inputs the pulse signal generated in the pulse switch 23, and determines whether consecutive pulses are detected in step S7.

If the determination in step S7 is YES, the controller 30 repeats the same process in step S7. If the determination in step S7 is N0, it is recognized that the leading end of the film 100 is released from the sprocket 21. Then, the controller 30 proceeds to step S8 to continue the reverse rotation during a period of time T2. That is, time T2 is selected to correspond to a time period required to completely retract the film 100 into the film cartridge 1.

Therefore, time T2 is determined on the basis of the rotation speed of the motor 11, the distance between the sprocket 21 and the inlet of the film cartridge and so on. Alternatively, it is possible to roughly set time T2 to be 2 to 3 seconds, taking into account a normal motor speed.

After time T2 has elapsed, the controller 30 proceeds to step S9 to deactivate the motor 11.

That is, when the film 100 is fully wound up to the end, the controller 30 carries out the rewinding operation in such a manner that the film 100 is completely accommodated into the film cartridge 1 in this embodiment, so that the film is surely prevented from being mistakenly used again.

Figure 5:
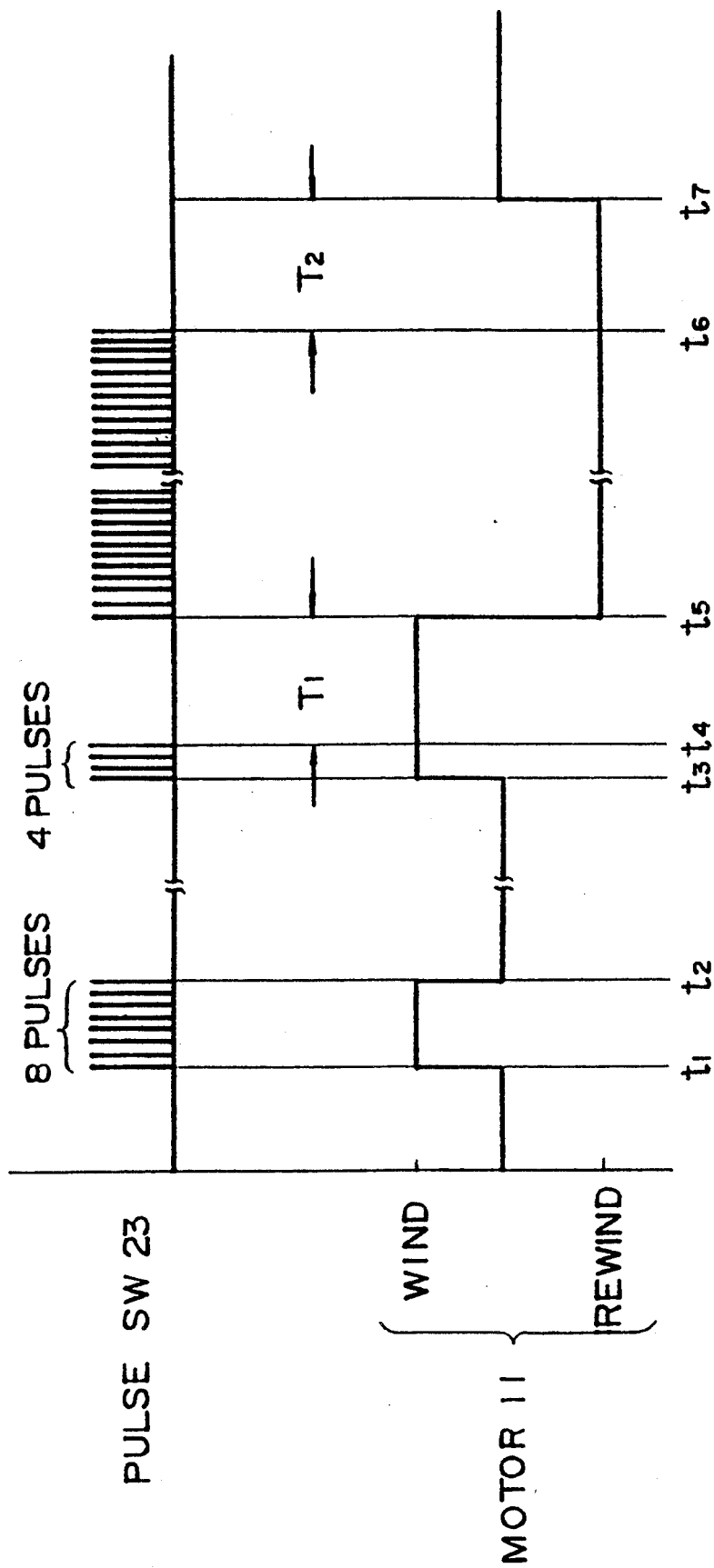
FIG. 5 is a time chart showing a winding and an automatic rewinding operation in the first embodiment.

FIG. 5 is a time chart showing the winding and the automatic rewinding operations of the motor 11. At the timing of t1, the motor 11 initiates to wind up the film 100 after finishing a photographing operation. The pulse switch 23 generates consecutive pulse signals in response to the winding operation of the motor 11. At the timing of t2, the pulse switch 23 generates an eighth pulse. It means that the one frame of the film 100 is completely wound. Therefore, the motor 11 is stopped.

Next, after finishing a next photographing operation, motor 11 initiates a winding operation at a timing of t3. In this instance, the motor 11 is stalled after the pulse switch 23 generated, for example, four pulses at the timing of t4. And, if the motor 11 continues to stall until the time has elapsed more than time T1 has elapsed after the pulse generation ceased at the timing t4, it is recognized that the film 100 is fully wound up to the end.

Then, at timing t5, the motor 11 initiates a reverse rotation to rewind the film 100. The pulse switch 23 generates consecutive pulses in accordance with the rewinding operation of the motor 11. And, at the timing of t6, the pulse switch 23 ceases to generate pulse signals, which means that the film 100 is released from the sprocket 21. But, the motor 11 continues to rewind until the time has elapsed more than time T2. And, motor 11 stops at the timing of t7. As shown in FIG. 5, at the timing of t7, the film 100 is completely retracted into the film cartridge 1 loaded on the camera.

Now, returning to step S1 of the flow chart of FIG. 3, if the determination in step S1 is N0, the controller 30 proceeds to step S10.

In step S10, it is determined to whether the rewind switch 35 is manipulated to an ON-condition. If the judgment in step S10 is N0, the controller 30 ends one cycle of the flow chart and returns to the beginning of the flow chart for another cycle; that is, the controller 30 repeats this cycle.

If the determination in step S10 is YES, the controller 30 proceeds to step S11, wherein the controller 30 controls the motor 11 to cause the reverse rotation in order to rewind the film 100 in response to the signal of the rewind switch 35. The detail control is performed in the same manner as step S6. Therefore, its explanation is omitted here.

Then the controller 30 determines as whether consecutive pulse signals are generated in step S12. If the answer is YES, step S12 is repeated until the answer turns to NO. The answer NO means that the leading end of the film 100 is released from the sprocket 21.

In response to the determination of NO in step S12, the controller 30 deactivates the motor 11 after a period of time T3 in a next step S13. The time T3 is selected to be a value that the film 100 can be stopped before being completely retracted into the film cartridge 1. That is, the time T3 needs to be restrictively determined on the basis of the rotational speed of the motor and the distance between the sprocket 21 and the inlet of the film cartridge 1. Otherwise, It is possible to set time T3 to be 0. In any event, the time T3 is a small value compared with the time T2.

If the time T3 has elapsed, the controller 30 deactivates the motor 11 in step S13, and ends one cycle of this flow chart, returning to the beginning of the flow chart.

Figure 7:
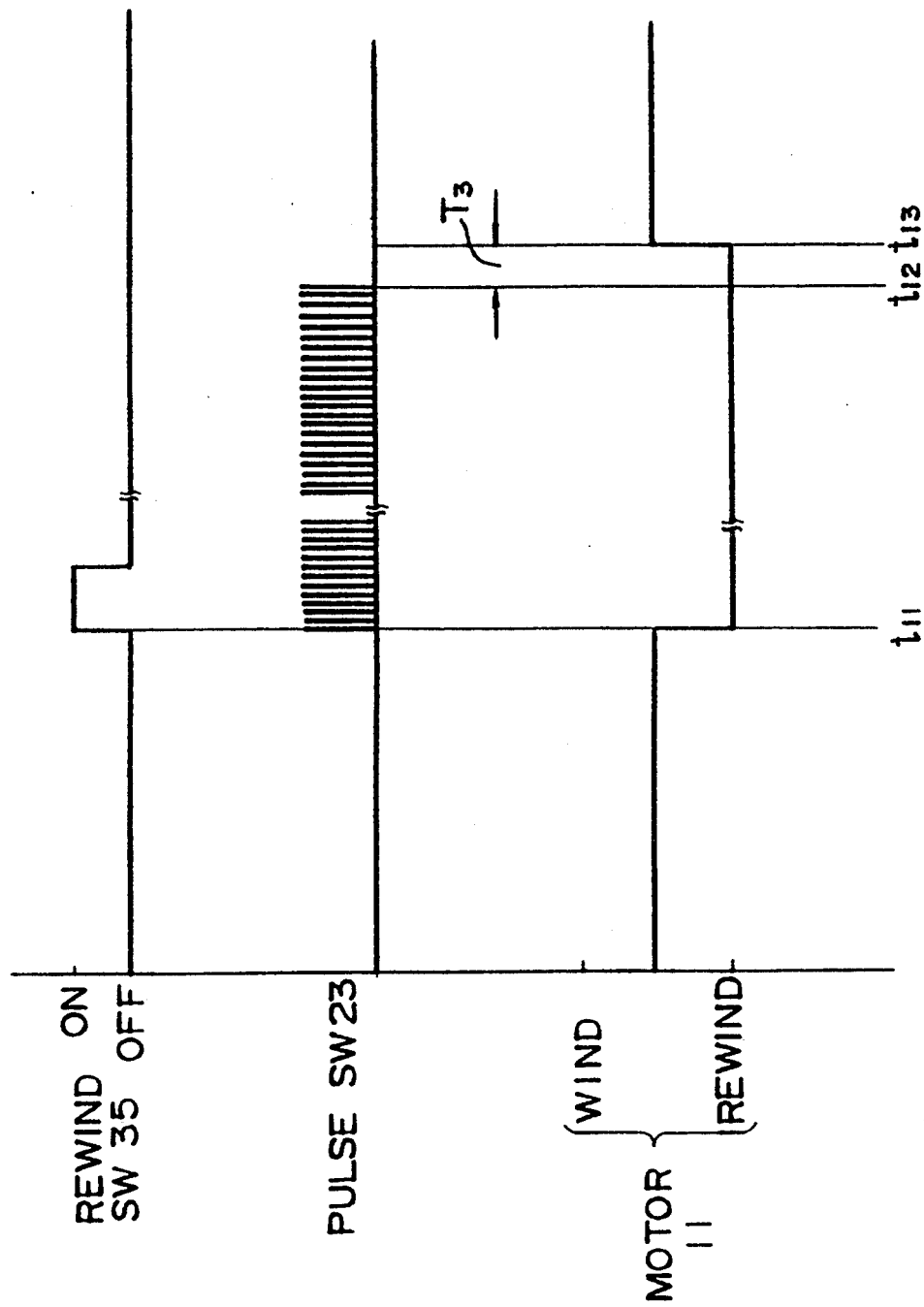
FIG. 7 is a time chart showing a forcible rewinding operation in the first embodiment.
Figure 8:
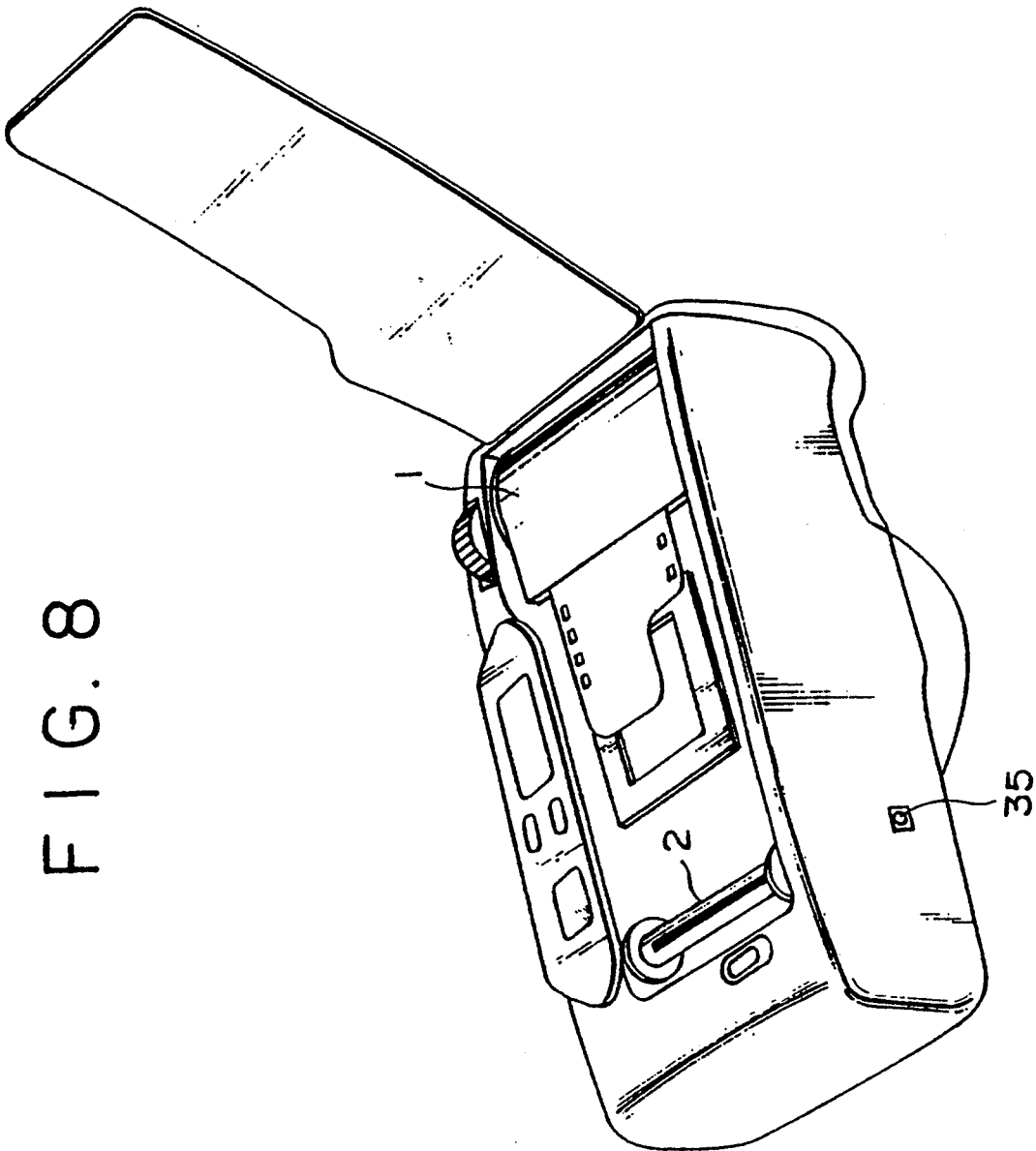
FIG. 8 is a view showing a condition wherein a film is incompletely rewound into a film cartridge.

FIG. 7 is a time chart showing the forcible rewinding operation of the motor 11. At the timing of t11, the motor 11 initiates a reverse rotation to rewind the film 100 upon manipulation of the rewind switch 35. The pulse switch 23 generates consecutive pulse signals in accordance with the rewinding operation of the motor 11. At time t12, the pulse switch 23 ceases to generate pulse signals, which means that the film 100 is released from the sprocket 21. But, the motor 11 continues to rewind until the short period of time T3 has elapsed. Then, the motor 11 stops at the timing of t13. As shown in Fig. 8 at the timing of t13, the film 100 is incompletely retracted into the film cartridge 1 loaded in the camera. Namely, at least a leading end of the film 100 remains out of the film cartridge 1 so that the film 100 can be easily pulled out again.

As is apparent from the foregoing description, when the film is forcibly rewound before it is fully wound up to the end, the rewinding operation is carried out in such a manner that at least the leading end of the film 100 remains out of the film cartridge 1, so that the film can be used again in an occasion for another photographing.

Namely, in accordance with this first embodiment, there is provided a film rewind apparatus for an automatic camera which comprises a means for winding a film by pulling out the film from a film cartridge loaded in a camera (i.e. the spool 2, the spool gear 4, the planetary gear 14, the arm 15, the sun gear 13, the reduction gear 12, and the motor 11); means for rewinding the film wound by the film winding means into the film cartridge again (i.e. the film cartridge 1, cartridge shaft 1a, the fork gear 3, the rewinding gears 17, 17a, the planetary gear 14, the arm 15, the sun gear 13, the reduction gear 12, and the motor 11); a film end detection means for detecting a condition that the film has been wound up to the end by the film winding means (i.e. the sprocket 21, the rotational element 22, the pulse switch 23, and the timer TM 32); and a rewind switch for forcibly initiating a rewinding operation of the film rewinding means before the film has been wound up to the end (i.e. the rewind switch 35).

According to the first embodiment, a rewinding amount control means causes the film rewinding means to rewind the film completely into the film cartridge when the film end detection means detects the condition that the film has been wound up to the end, and also causes the film rewinding means to rewind the film but to stop its rewinding operation in an incomplete condition, such that at least a leading end of the film remains out of the film cartridge when the rewind switch is manipulated (i.e. the controller 30, and steps S5 to S9, and steps S10 to S13 of the flow chart in FIG. 3).

Second Embodiment of the Film Rewinding Control

Referring now to the flow chart of FIG. 4, the second embodiment of the present invention is explained in detail hereinafter.

According to the flow chart of FIG. 4, a predetermined value CO is read in. The value CO is a value to determine whether an operator will not want to use the reminder of film after it is once rewound. Therefore, the value CO is, for example, set to be 70% to 80% the total frames of the film. The detection of the total frames is for example performed by reading a DX code provided on the film cartridge by means of a well-known detecting device. Alternatively, it will be also possible that the operator inputs a desired number manually as the CO when the film is loaded in the camera.

Next, it is determined to whether the release switch 34 is manipulated to an ON-position in step S22. If the determination is YES, the controller 30 carries out a predetermined photographing operation, which comprises an auto focus adjustment and an auto exposure adjustment in step S23. After the predetermined photographing operation has been completed, the controller 30 controls the motor 11 to initiate a normal rotation in step S24.

That is, in FIG. 2, the CPU 31 outputs a high signal to the base of the transistor Tr1. In response to this, the relay RL1 is energized accordingly, switch SW1 is switched over from the normally-closed contact to the normally-opened contact. Thus, the motor 11 is activated to cause a normal rotation.

Upon the motor 11 causing the normal rotation, the planetary gear 14 moves around the sun gear 13, guided by the arm 15 until it reaches the position to mesh with the spool gear 4, as is explained in the foregoing description of FIG. 1. Then, the film 100 begins to be wound up in the spool 2. In this instance, the sprocket 23 rotates in accordance with the perforations 101 passing in the winding operation. Therefore, the pulse switch 23 generates pulse signals on the basis of an amount of winding operation. The controller 30 inputs the count number counted in the pulse switch 23, and determines whether eight consecutive pulses are counted in step S25.

If the determination in step S25 is YES, it means that one frame of the film 100 has been completely wound. Therefore the controller 30 proceeds to step S39 to deactivate the motor 11 after an increment procedure C=C+1 in step S31. After, the motor 11 is deactivated in step S39, and the process returns to the beginning of this flowchart. The increment C=C+1 means that one frame of the film 100 is fully wound. That is, the value of C corresponds to the number of the exposed frames of the film 100. It should be noted that the value of C is set to 0 when the film 100 is loaded in the camera.

To deactivate the motor 11 in step S30, as is shown in FIG. 2, the CPU 31 outputs a low signal to the drive transistor Tr1. In response to this, the relay RL1 is deenergized and, in turn, switch SW1 is switched over to the normally-closed position. Thus, the motor 11 is stopped and electrodynamically braked.

If the determination in step S25 is NO, it is judged in step S26 whether the pulse generation has been stopped for more than time T1. Time T1 is freely selected, but it is usually desirable to be set between 1 to 3 seconds.

The time T1 is a period of time which is required to determine whether the film 100 has been completely wound up to the end in the spool 2. If the film 100 is fully pulled out of the film cartridge 1 under the condition that the base end of the film 100 is fixed to the cartridge shaft 1a of the film cartridge 1, the film 100 is tightly extended between the film cartridge 1 and the spool 2. In this condition, the motor 11 is rendered in a stall. Accordingly, if the pulse generation has been stopped for more than time T1, it is recognized that the film 100 has been completely wound.

If the determination in step S26 is NO, the controller returns to the previous step S25 to continue the determination in step S25. If the determination in step S26 is YES, the controller 30 proceeds to step S27, wherein the controller 30 controls the motor 11 to cause a reverse rotation.

That is, in FIG. 2, the CPU 31 outputs a high signal to the base of the transistor Tr2. In response to this, the relay RL2 is energized, accordingly, switch SW2 is switched over from the normally-closed contact to the normally-opened contact. Thus, the motor 11 is activated to cause a reverse rotation.

Upon the motor 11 causing the reverse rotation, the planetary gear 14 moves around the sun gear 13 guided by the arm 15 until it returns the position to mesh with the rewinding gear 17a, as is explained in the foregoing description of FIG. 1. Then, the film 100 begins to be rewound in the film cartridge 1. The controller 30 inputs the pulse signal generated in the pulse switch 23, and determines as to whether consecutive pulses are detected in step S28.

If the determination in step S28 is YES, the controller 30 repeats the same process in step S28. If the determination in step S28 is NO, it is recognized that the leading end of the film 100 is released from the sprocket 21. Then, the controller 30 proceeds to step S29 to continue the reverse rotation during a period of time T2. That is, time T2 is selected to correspond to a time period required to completely retract the film 100 into the film cartridge 1.

Therefore, time T2 is determined on the basis of the rotation speed of the motor 11, the distance between the sprocket 21 and the inlet of the film cartridge 1, and so on. Alternatively it is possible to roughly set time T2 to be 2 to 3 seconds, taking into account the normal motor speed.

After time T2 has elapsed, the controller 30 proceeds to step S30 to deactivate the motor 11.

Figure 6:
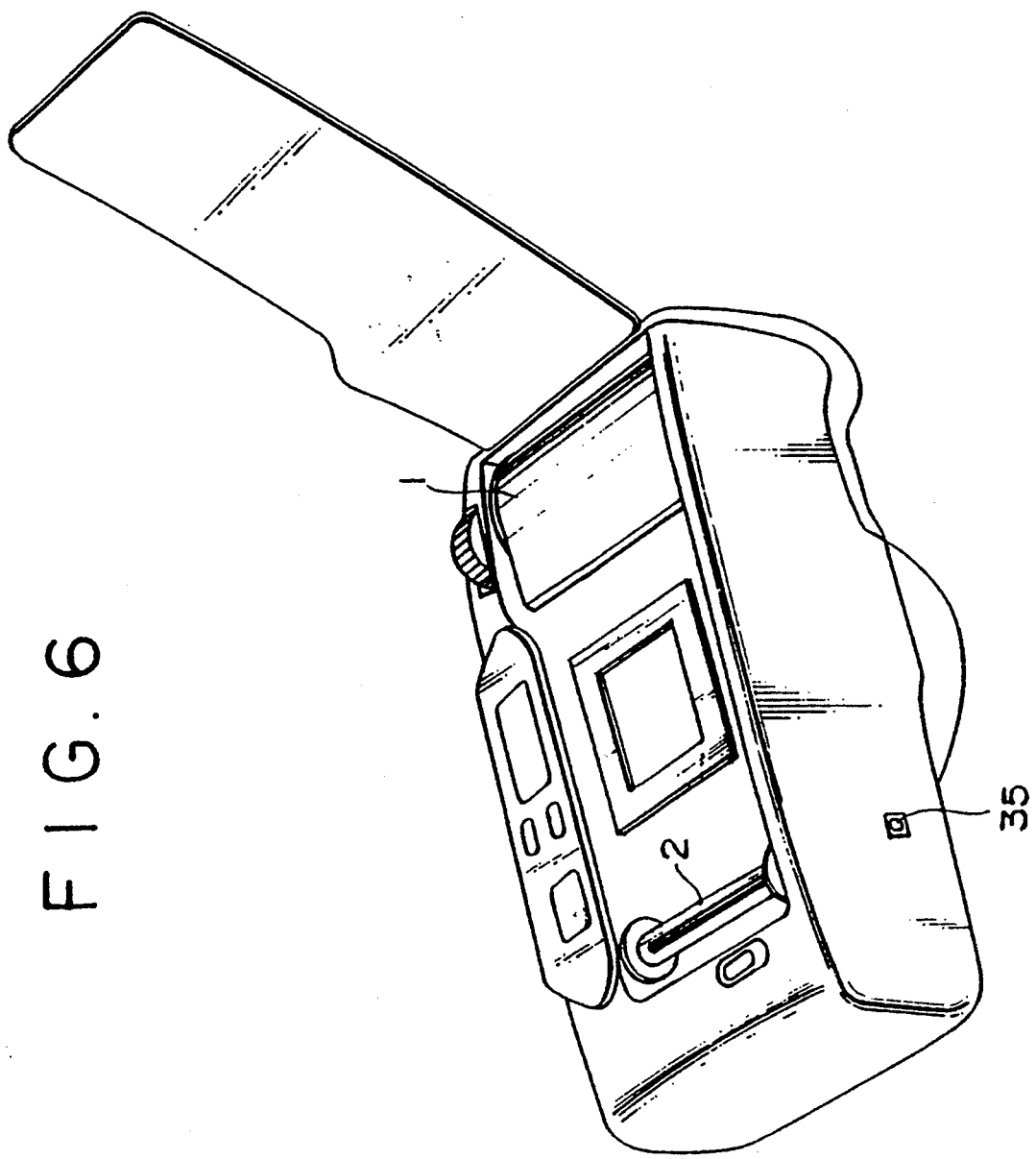
FIG. 6 is a view showing a condition that a film is completely rewound into a film cartridge.

The winding and rewinding operations of the motor 11 are explained in accordance with FIGS. 5 and 6 in the same way as the first embodiment. The details operation are already explained in the foregoing description of the first embodiment. Thus, it is omitted here.

If the determination in step S22 is NO, the controller 30 proceeds to step S32. In step S32, it is determined as whether the rewind switch 35 is manipulated to an ON-condition. If the determination in step S32 is NO, the controller 30 ends one cycle of the flow chart and returns to the beginning of the flow chart for another cycle; that is, the controller 30 repeats this cycle.

If the determination in step S32 is YES, it is determined whether the value C is greater than the value C0 (i.e. C>C0) in step S33. If the determination in step S33 is YES, the controller 30 proceeds to step S27 after resetting the value of C to 0 (i.e. C=0) in step S38.

The process illustrated by steps S33, and S38 expresses the characteristic feature of the second embodiment. That is, according to this second embodiment, the controller 30 carries out the rewinding operation in such a manner that the film 100 is completely accommodated into the film cartridge 1 in this embodiment, not only when the film 100 is fully wound up to the end, but also when a predetermined greater percentage of the film 100 is already exposed, so that the film is surely prevented from being mistakenly used again.

FIG. 9 is a time chart showing the forcible rewinding operation of the motor 11. When the rewind switch 35 is manipulated to an ON-position at the timing of time t21, the determination C>Co is YES in the process S33, S38, and S27-S30. The motor 11 initiates a reverse rotation to rewind the film 100 at the timing of t21. The pulse switch 23 ceases to generate pulse signals at the timing of t22, since the film 100 is released from the sprocket 21. Then, after time T2 has elapsed, the motor 11 is deactivated at timing t23. Accordingly, during the period of relatively large time T2, the film 100 is completely retracted into the film cartridge 1, as shown in Fig. 6.

Returning to the flow chart of FIG. 4, if the determination in step S33 is NO, the controller 30 proceeds to step S35 after resetting the value of C to 0 (i.e. C=0) in the step S34. In step S35, the controller 30 controls the motor 11 to cause a reverse rotation in order to rewind the film 100 in response to the signal of the rewind switch 35. The detail control is performed in the same manner as step S27.

Then the controller 30 determines whether consecutive pulse signals are generated in step S36. If the determination is YES, step S36 is repeated until the answer turns to NO. The answer NO means that the leading end of the film 100 is released from the sprocket 21.

In response to the determination of NO in step S36, the controller 30 immediately deactivates the motor 11 in this embodiment in step S37. But, it is also desirable to deactivate the motor 11 after a period of time T3, which is restrictively determined on the basis of the rotational speed of the motor 11 and the distance between the sprocket 21 and the inlet of the film cartridge 1, so that time T3 is a sufficient value that the film 100 can be stopped before completely retracted into the film cartridge 1.

After the controller 30 deactivates the motor 11 in step S37, it ends one cycle of this flow chart and returns to the beginning of the flow chart.

FIG. 10 is a time chart showing the forcible rewinding operation of the motor 11. When the rewind switch 35 is manipulated to an ON-position at the timing of time t31, the determination C>Co is NO in steps S33, S34, and S35-S37. The motor 11 initiates a reverse rotation to rewind the film 100 at the timing of t31. The pulse switch 23 ceases to generate pulse signals at the timing of t32, since the film 100 is released from the sprocket 21. Then, the motor 11 is immediately deactivated at the timing t32. Accordingly, the film 100 is incompletely retracted into the film cartridge 1 in a condition similar to FIG. 8.

As is apparent from the foregoing description, when the film is forcibly rewound before it is fully wound up to the end, and if the remaining amount of the film is determined to be a significant value sufficient when the operator will want to use the film again, the rewinding operation is carried out in such a manner that at least the leading end of the film 100 remains out of the film cartridge 1, so that the film can be used again in an occasion for another photographing.

Namely, in accordance with this second embodiment, there is provided a film rewind apparatus for an automatic camera having a film rewind apparatus for an automatic camera which comprises a film winding means for winding a film by pulling out the film from a film cartridge loaded on a camera (i.e. the spool 2, the spool gear 4, the planetary gear 14, the arm 15, the sun gear 13, the reduction gear 12, and the motor 11); a film rewinding means for rewinding the film wound by the film winding means into the film cartridge again (i.e. the film cartridge 1, cartridge shaft 1a, the fork gear 3, the rewinding gears 17, 17a, the planetary gear 14, the arm 15, the sun gear 13, the reduction gear 12, and the motor 11); a film remainder determining means for whether the film has a sufficient amount remaining (i.e. the sprocket 21, the rotational element 22, and the pulse switch 23); and a rewind switch for forcibly initiating a rewinding operation of the film rewinding means before the film has been wound up to the end (i.e. the rewind switch 35).

According to the second embodiment, a rewinding amount control means responds to a manipulation of the rewind switch in such a manner as to cause the film rewinding means to rewind the film completely into the film cartridge when the film remainder determining means determines that the film does not have a predetermined sufficient remainder, and also to cause the film rewinding means to rewind the film, but to stop its rewinding operation in an incomplete condition, such that at least a leading end of the film remains out of the film cartridge when the film remainder determining means determines that the film has a predetermined sufficient remainder (i.e. the controller 30, and steps S32 to S39, and steps S27 to S30 of the flow chart in FIG. 4).

As this invention may be embodied in several forms without departing from the spirit of essential characteristics thereof, the present embodiment is therefore illustrative and not restrictive, since the scope of the invention is defined by the appending claims, rather than by the description preceding them, and all changes that fall within the meets and bounds of the claims, or equivalence of such meets and bounds are therefore intended to be embraced by the claims.

The present disclosure relates to subject matter contained in Japanese Patent Application No. HEI 3-108074, filed on Feb. 18, 1991, which is expressly incorporated herein by reference in its entirety.

What is claimed is:

1. A film rewind apparatus employed in an automatic camera for automatically rewinding the film pulled out of a cartridge, said film including a leader portion and a main portion having a plurality of image frames, comprising:

means for selecting one of a first and second operation mode;

means for automatically rewinding said film, said rewinding means being operated in either said first or second operation mode; and means for controlling said rewinding of said film in such a fashion that a rewinding operation is completed with a leading end of said film being retracted into said cartridge when said first operation mode is selected, while said rewinding operation is completed with said leading end of said film remaining outside of said cartridge when said second operation mode is selected, said controlling means comprising means for detecting an area where said leader portion meets said main portion when said film is being rewound, so that when said area is detected said film is rewound for a first time period if said first operation mode is selected and said film is rewound for a second time period if said second operation mode is selected, wherein said second time period is shorter than said first time period.

2. The film rewind apparatus of claim 1, wherein said camera comprises means for winding said film, and said selecting means comprises means for detecting an end of said film, said film being rewound in said first operation mode when said end of said film has been detected.

3. The film rewind apparatus of claim 2, wherein said means for detecting said end of said film comprises means for generating a predetermined signal, said generating means generating said predetermined signal when said film is fed, and wherein said end of said film is detected when said winding means is operated and said predetermined signal has not been generated for a predetermined period of time.

4. The film rewind apparatus of claim 1, wherein said selecting means comprises means for instructing to start rewinding, said film being rewound in said second operation mode upon instruction from said instructing means.

5. The film rewind apparatus of claim 1, wherein said camera comprises means for instructing to start rewinding, and said selecting means comprises mode determining means for selecting one of said first and second operation modes in accordance with film frames remaining unused.

6. The film rewind apparatus of claim 5, wherein said camera comprises means for detecting a number of frames included in said film loaded in said camera, means for determining a reference value, and wherein said rewinding means is operated in said second operation mode when said number of frames remaining unused is greater than said reference value.

7. The film rewind apparatus of claim 1, wherein said control means stops rewinding said film after said leading end is retracted into said cartridge when said rewinding means is operated in first operation mode, while said control means stops rewinding said film before said leading end is retracted into said cartridge when said rewinding means is operated in said second operation mode.

8. The film rewind apparatus of claim 7, wherein said camera comprises means for winding said film, and wherein said means for detecting said area of said film where said leader portion meets said main portion comprises means for generating a predetermined signal, said generating means generating a predetermined signal when said film is fed so that said area is detected when said rewinding means is operated and said predetermined signal has not been generated for a predetermined period of time.

9. The film rewind apparatus of claim 1, wherein said camera comprises a motor having a shaft member that is capable of forwardly and reversely rotating, and a gear train for selectively transmitting said rotation of said shaft member to means for winding said film and said rewinding means in correspondence with a rotational direction of said shaft member.

10. The film rewind apparatus of claim 9, wherein said gear train comprises a sun gear that is mechanically connected to said motor and a planetary gear that is capable of being selectively and mechanically connected to said winding means and said rewinding means for transmitting a rotational force from said sun gear.

11. A method for rewinding a film, which includes a leader portion and a main portion having a plurality of image frames, into a cartridge located in an automatic camera, the camera having means for automatically rewinding film, the method comprising the steps of:

selecting one of a first and second rewind mode;

starting a rewinding operation; and completing the rewinding operation in such a fashion that a leading end of the film is retracted into the cartridge when the first rewind mode is selected, while the leading end of the film remains outside of the cartridge when the second rewind mode is selected, the step of completing the rewinding operation comprising detecting an area where said leader portion meets said main portion of the film before the film is retracted into the cartridge, ceasing the rewinding operation when a first predetermined period has passed since the meeting area of the film was detected when the first rewind mode has been selected, and ceasing the rewind mode when a second predetermined period has passed since the meeting area of the film was detected when the second mode has been selected, wherein the second predetermined period is shorter than the first predetermined period.

12. The method of claim 11, further comprising the step of winding the film, the step of selecting one of the first and second rewind modes comprises discriminating whether a last frame of the film has been used, and selecting the first rewind mode when it is discriminated that the last frame of the film has been used.

13. An automatic camera that is capable of automatically rewinding a film which has been pulled out of a cartridge, said film including a leader portion and a main portion having a plurality of image frames, comprising:

means for selecting one of a first and second rewind mode;

means for automatically rewinding said film, said rewinding means being operating in either said first or second rewind modes; and means for controlling said rewinding of said film in such a fashion that a rewinding operation is completed with said leading end of said film being retracted into said cartridge when said first rewind mode is selected, while said rewinding operation is completed with said leading end of said film remaining outside of said cartridge when said second rewind mode is selected, said controlling means comprising means for detecting an area where said leader portion meets said main portion when said film is being rewound, so that when said area is detected said film is rewound for a first time period if said first rewind mode is selected and said film is rewound for a second time period if said second rewind mode is selected, wherein said second time period is shorter than said first time period.

14. The camera of claim 13, wherein the control means stops said rewinding operation after said leading end is retracted into said cartridge when said rewinding means is operated in said first rewind mode, while said control means stops said rewinding operation before said leading end is retracted into said cartridge when said rewinding means is operated in said second rewind mode.

15. A film rewind apparatus for an automatic camera, comprising:
   means for winding a film, which includes a leader portion and a main portion having a plurality of image frames, by pulling out said film from a film cartridge loaded in a camera;
   means for rewinding said film that has been wound by said film winding means back into said film cartridge;
   means for detecting an end of film condition indicating that said film has been completely wound up by said film winding means;
   a rewind switch for forcibly initiating a rewinding operation of said film rewinding means before said film has been completely wound up; and
   means for controlling a rewind amount which causes said film rewinding means to rewind said film completely into said film cartridge when said film end detection means detects that said film has been completely wound up, and also causing said film rewinding means to rewind said film to an incomplete condition such that at least a leading end of said film remains outside of said film cartridge when said rewind switch is manipulated, said control means comprising means for detecting an area where said leader portion meets said main portion when said film is being rewound, so that when said area is detected said film is rewound for a first time period if said film end detection means detects that said film has been completely wound up and said film is rewound for a second time period when said rewind switch is manipulated, wherein said second time period is shorter than said first time period.

16. The film rewind apparatus of claim 15, wherein said detecting means detects a film releasing timing that indicates whether said film is released from said film winding means, so that said rewinding amount is controlled by varying a time duration after detection of said film releasing timing until said rewinding operation is stopped.

17. The film rewind apparatus of claim 16, wherein said time duration when the rewind switch is manipulated is set to be shorter than when said film end detection means detects that said film has been completely wound up.

18. A film rewind apparatus for an automatic camera, comprising:
   means for winding a film by pulling said film out of a film cartridge that is loaded in a camera;
   means for rewinding said film that has been wound by said film winding means back into said film cartridge;
   means for determining an amount of film remaining so as to determine whether said film has a predetermined sufficient amount of film remaining;
   a rewind switch for forcibly initiating a rewinding operation of said film rewinding means before said film has been wound up to an end; and
   means for controlling a rewinding amount which responds to a manipulation of said rewind switch in such a manner as to cause said film rewinding means to rewind said film completely back into said film cartridge when said film remaining determining means determines that said film does not have a predetermined sufficient amount of film remaining, and also to cause said film rewinding means to rewind said film to an incomplete condition such that at least a leading end of said film remains outside of said film cartridge when said film remaining determining means determines that said film has a predetermined sufficient amount of film remaining;
   said film including a leader portion and a main portion having a plurality of images, and said rewinding amount control means comprising means for detecting an area where said leader portion meets said main portion when said film is being rewound, so that when said area is detected, said film is rewound for a first time period, when said film remaining determining means determines that said film has been wound up to said end, and said film is wound for a second time period, when said film remaining determining means determines that said film has a predetermined sufficient amount of film remaining, wherein said second time period is shorter than said first time period.

19. A film rewind apparatus for an automatic camera, comprising:
   a film cartridge having a cartridge shaft and being loaded into a camera for accommodating a film;
   a spool that is disposed in said camera for winding said film up;
   a motor for winding said film onto said spool by pulling said film from said film cartridge and for rewinding said film back into said film cartridge;
   a plurality of gears for transmitting a rotational force of said motor to said cartridge shaft and said spool;
   a pulse switch for generating a signal in response to a movement of said film;
   means for determining whether a predetermined sufficient amount of film remains;
   a rewind switch for forcibly initiating a rewinding operation of said motor before said film has been would up to an end; and
   a rewinding amount control means for controlling a rewinding amount which responds to said determining means and said rewind switch in such a manner to cause said motor to rewind said film completely back into said film cartridge when said determining means determines that a predetermined sufficient amount of film does not remain, and also to cause said motor to rewind said film to an incomplete condition such that at least a leading end of said film remains outside of said film cartridge when a predetermined sufficient amount of film remains;
   said film including a leader portion and a main portion having a plurality of images, and said rewinding amount control means comprising means for detecting an area where said leader portion meets said main portion when said film is being rewound, so that when said area is detected, said film is rewound for a first time period, when said film remaining determining means determines that film has been wound up to said end, and said film is rewound for a second time period, when said film remaining determining means determines that said film has a predetermined sufficient amount of film remaining, wherein said second time period is shorter than said first time period.

20. The film rewind apparatus of claim 19, wherein said plurality of gears includes a sun gear and a planetary gear that cooperate together to switch a transmission path of said plurality of gears.

21. The film rewind apparatus of claim 19, further comprising a driving circuit for actuating said DC motor to cause a normal rotation and a reverse rotation.

22. The film rewind apparatus of claim 21, wherein said plurality of gears includes a sun gear and a planetary gear which cooperate together to switch a transmission path of said plurality of gears between a winding path and a rewinding path in dependence of a normal rotation or a reverse rotation of said motor.

23. The film rewinding apparatus of claim 19, wherein said pulse switch is cooperative with a sprocket which is rotated by perforations provided on the film.

24. A film rewind method for an automatic camera which includes means for winding a film, that includes a leader portion and a main portion having a plurality of frame images, by pulling the film out of a film cartridge that is loaded in the camera, means for rewinding the film that has been wound by the film winding means back into the film cartridge, a rewind switch for forcibly initiating a rewinding operation of the film rewinding means before the film has been wound up to an end, the film rewinding method comprising the steps of:
  detecting an automatic rewind condition indicating that the film has been wound up to the end by the film winding means;
  detecting a forcible rewind condition when the rewind switch is manipulated by an operator;
  controlling a rewinding amount of the film by the film rewinding means to rewind the film completely back into the film cartridge when the automatic rewind condition is detected, and also to rewind the film to an incomplete condition such that at least a leading end of the film remains out of the film cartridge when the forcible rewind condition is detected, the rewinding amount controlling step comprising detecting an area between the leader portion and main portion of the film, rewinding the film for a first time period when the automatic rewind condition is detected, and rewinding the film for a second time period when the forcible rewind condition is detected, the second time period being shorter than the first time period.

25. The film rewind method of claim 24, wherein the step of detecting an automatic rewind condition comprises the step of counting predetermined pulses generated in accordance with one complete frame winding up to determining whether the film is fully wound up to the end.

26. The film rewind method of claim 24, wherein the rewinding amount controlling step comprises detecting a releasing timing that the film is released from the film winding means, the rewinding amount controlling step controlling a time duration after the releasing timing until the rewinding operation is stopped.

27. A film rewind method for an automatic camera including means for winding a film by pulling the film from a film cartridge that is loaded in a camera, means for rewinding the film wound by the film winding means back into the film cartridge, a rewind switch for forcibly initiating a rewinding operation of the film rewinding means before the film has been wound up to the end, the film rewinding method comprising the steps of:
  determining whether the film has a predetermined sufficient remainder;
  controlling a rewinding amount in response to a manipulation of the rewind switch in such a manner to cause the film rewinding means to rewind the film completely back into the film cartridge when the film does not have a predetermined sufficient remainder, and also to cause the film rewinding means to rewind the film to an incomplete condition such that at least a leading end of the film remains outside of the film cartridge when the film has a predetermined sufficient remainder;
  said film comprising a leader portion and a main portion having a plurality of images, and said rewinding amount controlling step comprising detecting, while the film is being rewound, an area between the leader portion and the main portion of the film, rewinding the film for a first time period when the film does not have a sufficient remainder, and rewinding the film for a second time period when the film does have a predetermined sufficient remainder, wherein the second time period is shorter than the first time period.

28. The film rewind method of claim 27, wherein the step of determining the remainder of the film comprises counting a frame number of the film which is already exposed.

29. A film rewind method for an automatic camera having a film cartridge with a cartridge shaft and being loaded in a camera for accommodating a film, a spool that is disposed in the camera for winding up the film, a DC motor for winding a film onto the spool by pulling out the film from the film cartridge and for rewinding the film back into the film cartridge, a group of gears for transmitting a rotational force of the DC motor to the cartridge shaft and the spool, a pulse switch for generating a signal in response to a movement of the film, a rewind switch for forcibly initiating a rewinding operation of the DC motor before the film has been wound up to the end, the film rewind method comprising the steps of:
  determining whether the film has a predetermined sufficient remainder;
  controlling a rewinding amount in such a manner to cause the DC motor to rewind the film completely into the film cartridge when the film does not have a predetermined sufficient remainder, and also to cause the DC motor to rewind the film to an incomplete condition such that at least a leading end of the film remains outside of the film cartridge when the film has a predetermined sufficient remainder;
  said film comprising a leader portion and a main portion having a plurality of images, and said rewinding amount controlling step comprising detecting, while the film is being rewound, an area between the leader portion and the main portion of the film, rewinding the film for a first time period when the film does not have a sufficient remainder, and rewinding the film for a second time period when the film does have a predetermined sufficient remainder, wherein the second time period is shorter than the first time period.

30. The film rewind apparatus of claim 3, wherein the camera comprises a chamber for accommodating the film cartridge, a spool for winding the film, and a chamber for accommodating the wound film, and wherein said generating means is arranged between the chamber for accommodating the film cartridge and the chamber for accommodating the wound film.

31. A film rewind apparatus that is employable in an automatic camera that is capable of automatically rewinding a film, that includes a leader portion and a main portion having a plurality of image frames, which has been fed from a cartridge, comprising:

means for rewinding said film in at least a first mode in which a rewinding operation is completed with a leading end of said film being retracted into said cartridge, and a second mode in which said rewinding operation is completed with said leading end of said film remaining outside of said cartridge; and means for selecting one of said first and second modes;

said rewinding means comprising means for detecting an area where said leader portion meets said main portion when said film is being rewound, so that when said area is detected said film is rewound for a first time period if said first mode is selected and said film is rewound for a second time period if said second mode is selected, wherein said second time period is shorter than said first time period.

* * * * *

UNITED STATES PATENT AND TRADEMARK OFFICE
CERTIFICATE OF CORRECTION

PATENT NO. : 5,341,187
DATED : August 23, 1994
INVENTOR(S) : H. KUREI

It is certified that error appears in the above-indentified patent and that said Letters Patent is hereby corrected as shown below:

At column 15, line 3 (claim 14, line 1), change "the" (second occurrence) to ---said---.

At column 16, line 45 (claim 19, line 18) change "would" to ---wound---.

Signed and Sealed this

Second Day of May, 1995

Attest:

*Attesting Officer*

BRUCE LEHMAN

*Commissioner of Patents and Trademarks*